(12) United States Patent
Zintz et al.

(10) Patent No.: US 11,618,198 B2
(45) Date of Patent: Apr. 4, 2023

(54) METHOD FOR SETTING AN OPERATING POINT OF A FILM STRETCHING MACHINE AND FILM STRETCHING SYSTEM FOR PRODUCING A PLASTICS FILM

(71) Applicant: Brückner Maschinenbau GmbH & Co. KG, Siegsdorf (DE)

(72) Inventors: Wolfgang Zintz, Vachendorf (DE); Marion Zintz, Vachendorf (DE); Thomas Barth, Rosenheim (DE)

(73) Assignee: BRÜCKNER MASCHINENBAU GmbH & CO. KG, Siegsdorf (DE)

( * ) Notice: Subject to any disclaimer, the term of this patent is extended or adjusted under 35 U.S.C. 154(b) by 0 days.

(21) Appl. No.: 17/070,146

(22) Filed: Oct. 14, 2020

(65) Prior Publication Data
US 2021/0107198 A1 Apr. 15, 2021

(30) Foreign Application Priority Data
Oct. 15, 2019 (DE) .................. 10 2019 127 778.7

(51) Int. Cl.
- *B29C 48/00* (2019.01)
- *B29C 48/08* (2019.01)
- *B29C 48/92* (2019.01)

(52) U.S. Cl.
CPC .......... *B29C 48/0018* (2019.02); *B29C 48/08* (2019.02); *B29C 48/92* (2019.02);
(Continued)

(58) Field of Classification Search
None
See application file for complete search history.

(56) References Cited

U.S. PATENT DOCUMENTS

| | | | |
|---|---|---|---|
| 3,890,078 | A | 6/1975 | Straumanis |
| 2011/0209619 | A1 | 9/2011 | Lazarevic et al. |
| 2019/0240888 | A1 | 8/2019 | Lössl et al. |

FOREIGN PATENT DOCUMENTS

| | | |
|---|---|---|
| CN | 1233298 A | 10/1999 |
| CN | 201665035 U | 12/2010 |

(Continued)

OTHER PUBLICATIONS

Notification of the First Office Action for Chinese Application No. 202011100641.6, six pages, dated Mar. 29, 2022.
(Continued)

*Primary Examiner* — Robert J Grun
(74) *Attorney, Agent, or Firm* — Nixon & Vanderhye P.C.

(57) ABSTRACT

The method for setting an operating point of a film stretching system comprises the method steps:
acquiring an input, wherein the input contains:
a) a target value for the first production variable; or
b) a target value for the second production variable; or
c) a target value for the third production variable;
specifying:
a) a setting value for the second production variable and the third production variable in order to achieve the target value for the first production variable; or
b) a setting value for the first production variable and the third production variable in order to achieve the target value for the second production variable); or
c) a setting value for the first production variable and the second production variable in order to achieve the target value for the third production variable;
controlling the motor arrangement and the extruder arrangement by the control device in such a way that the operating point consisting of the target value and two setting values is reached.

23 Claims, 9 Drawing Sheets

Figure 1:
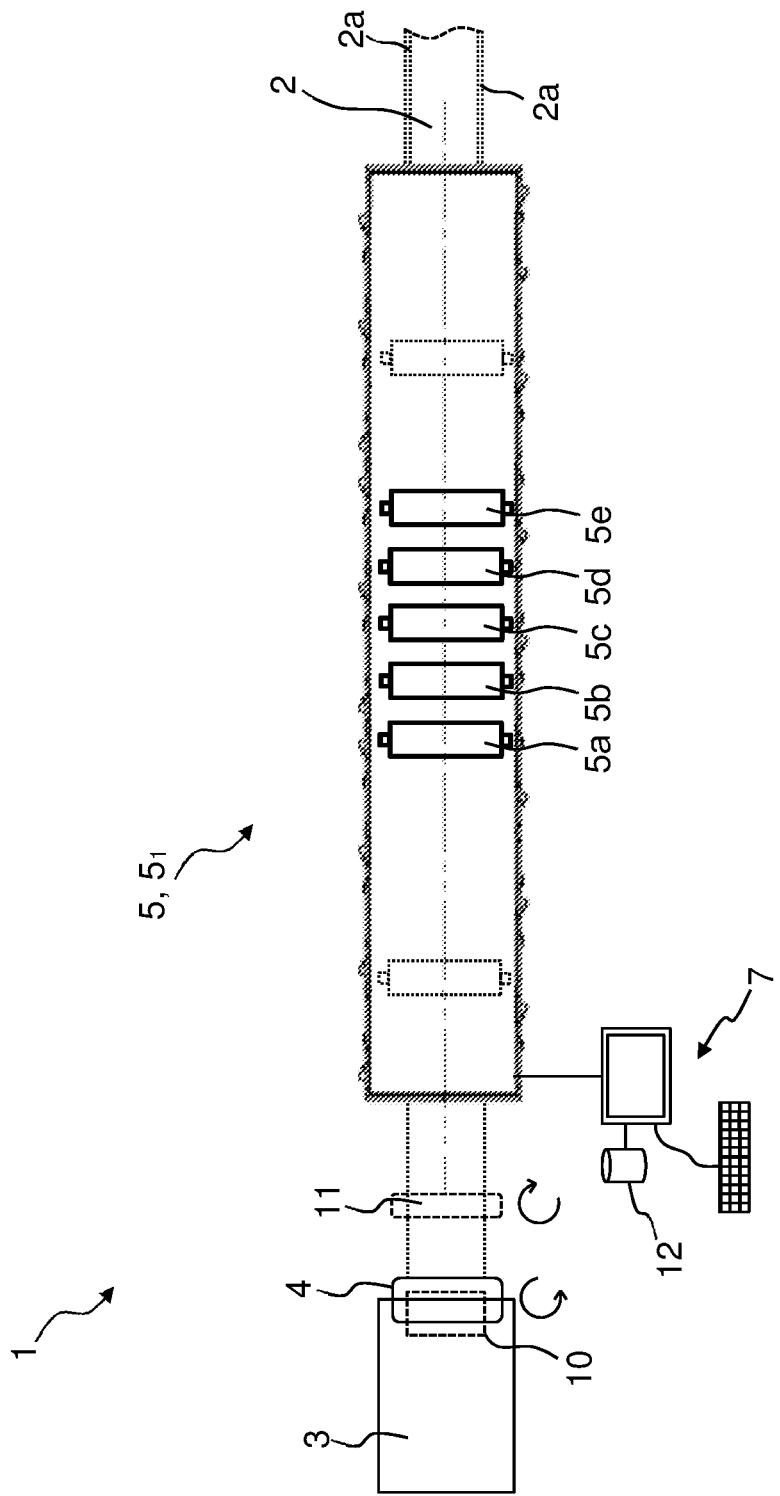

(52) U.S. Cl.
CPC .............. *B29C 2948/926* (2019.02); *B29C 2948/92438* (2019.02); *B29C 2948/92466* (2019.02); *B29C 2948/92647* (2019.02); *B29C 2948/92657* (2019.02)

(56) References Cited

FOREIGN PATENT DOCUMENTS

| | | |
|---|---|---|
| CN | 101940856 A | 1/2011 |
| CN | 102196852 A | 9/2011 |
| CN | 103370464 A | 10/2013 |
| CN | 109311211 A | 2/2019 |
| CN | 109789628 A | 5/2019 |
| DE | 2304243 | 8/1973 |
| DE | 4443158 A1 | 6/1996 |
| DE | 10 2016 112 121 | 1/2018 |
| JP | S5642628 A | 4/1981 |
| JP | H05228981 A | 9/1993 |
| WO | 2008078858 A1 | 7/2008 |

OTHER PUBLICATIONS

Sun Yuanwei, "Automatic Thickness Control for Biaxially Stretched Film Production Line", four pages, Chemical World No. 10, China Academic Journal Electronic Publishing House, <http://www.cnki.net>, published Oct. 25, 1997.

Chinese First Office Action and its English Translation for Chinese Application No. 201980009601.X, dated Jun. 3, 2021, 22 pages.

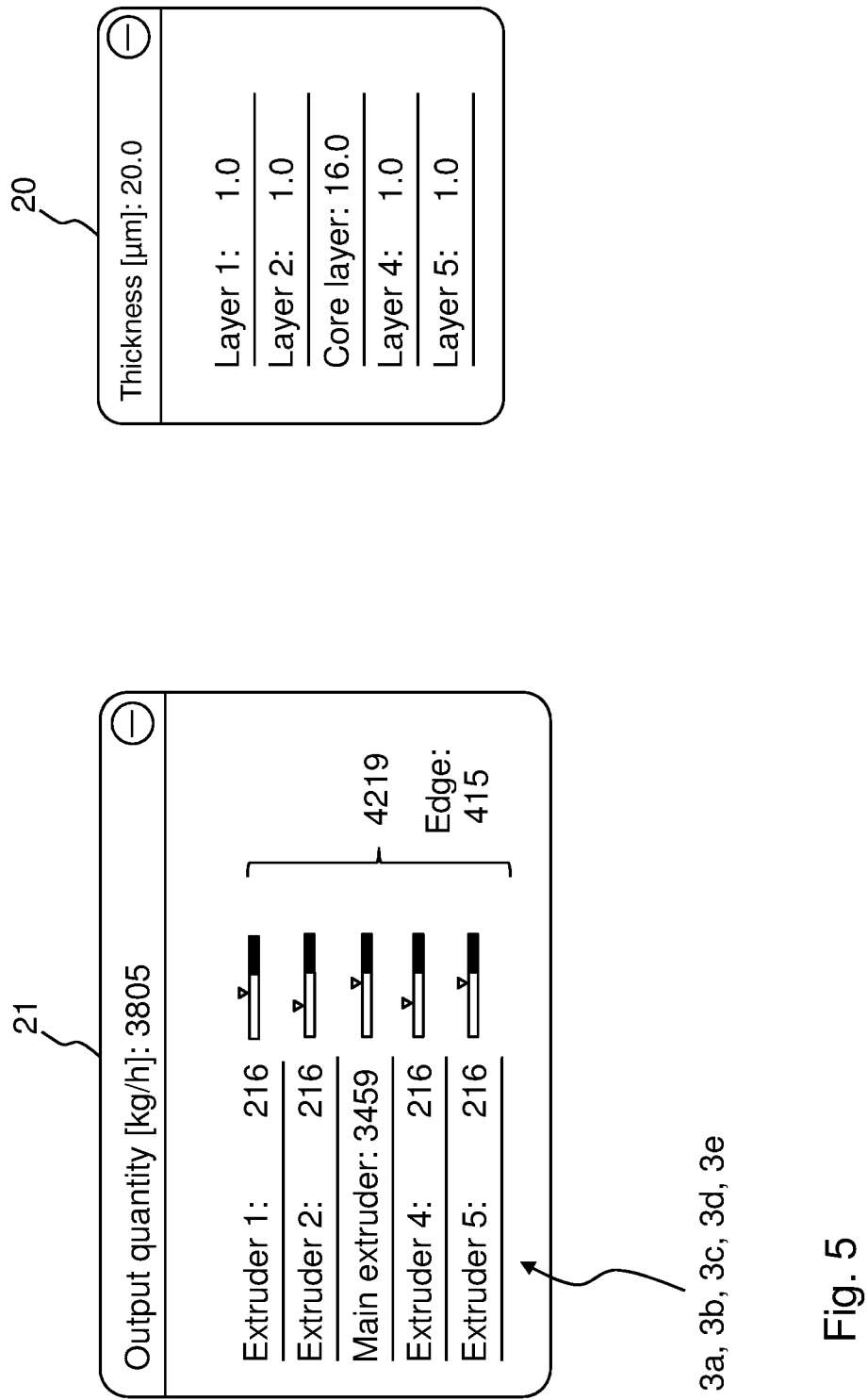

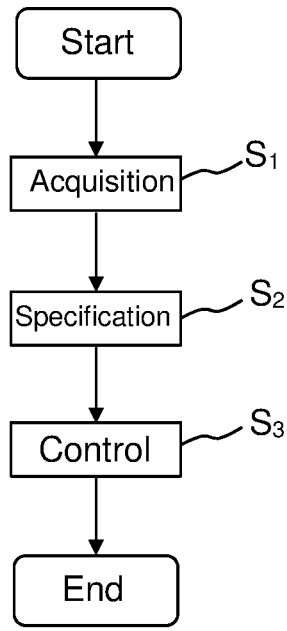
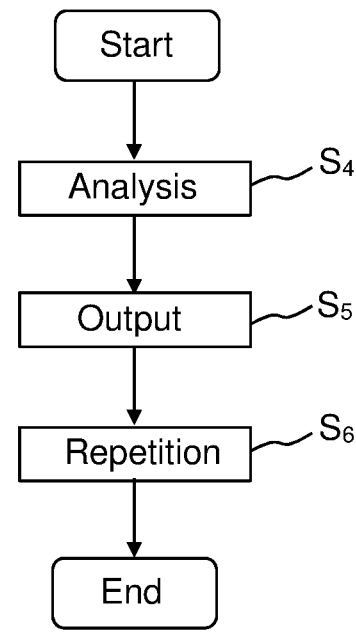
Fig. 7A
Fig. 7B
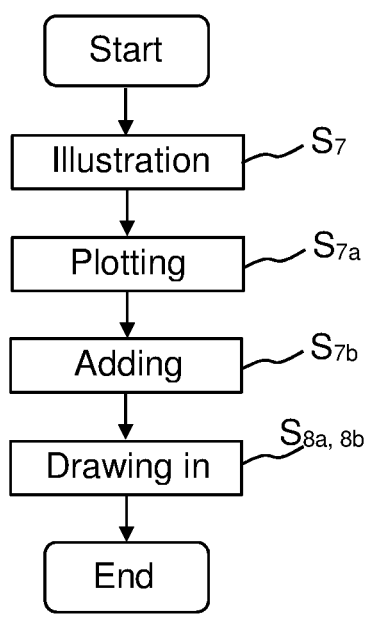
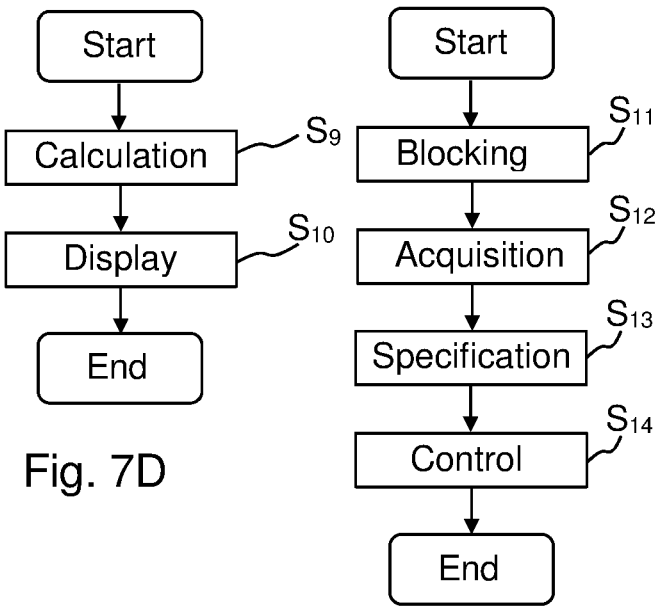
Fig. 7C
Fig. 7D
Fig. 7E

METHOD FOR SETTING AN OPERATING POINT OF A FILM STRETCHING MACHINE AND FILM STRETCHING SYSTEM FOR PRODUCING A PLASTICS FILM

CROSS-REFERENCE TO RELATED APPLICATION

This application claims priority to DE Patent Application No. 10 2019 127 778.7 filed Oct. 15, 2019, the entire contents of which are hereby incorporated by reference.

The invention relates to a method for setting an operating point of a film stretching system and to a film stretching system for producing a plastics film. In the context of this invention, a film stretching system comprises a stretching arrangement which comprises a longitudinal stretching system for stretching the film in the longitudinal direction and optionally a transverse stretching system for stretching the film in the transverse direction. A longitudinal stretching system for stretching the film in the longitudinal direction is usually referred to as an MDO. In such a longitudinal stretching system, the stretching ratio is adjustable. However, a casting system can also be a longitudinal stretching system for stretching the film in the longitudinal direction. The stretching ratio cannot be adjusted in this case. A transverse stretching system for stretching the film in the transverse direction is usually referred to as a TDO and can optionally also be provided.

For the production of films, the starting materials are usually fed to an extruder and liquefied therein by heating. This plastics melt is then pressed through a flat film extrusion die, which can also be referred to as a slot die. This plastics melt is then applied or discharged onto a cooled roller (chill roll).

Subsequently, the plastics melt, which is discharged onto the chill roll and can also be referred to as cast film or melt film, is fed to additional devices (stretching arrangement) via further rollers, which stretch the cast film in the longitudinal direction and/or in the transverse direction (=stretching). These additional rollers are at different distances from the ground, so that the cast film has a meandering course. These additional rollers can also have different speeds of rotation and/or be at different temperatures. After the stretching arrangement, the plastics film is wound up.

Using film stretching systems, different types of films (composition, thickness, etc.) can be produced in a very short time. These production properties are changed via an operating terminal, via which the user enters the corresponding target parameters. The film thickness depends largely on the output quantity of the extruder arrangement and the line speed. A higher line speed with the same output quantity results in a thinner plastics film. A reduced line speed with the same output quantity results in a thicker plastics film. The operator of the film stretching system currently has to convert all these parameters with one another and enter the corresponding setpoint specifications for these parameters so that he obtains a plastics film in accordance with his ideas. Such a conversion of these variables is error-prone, however.

The object of the present invention is therefore to create a method for setting an operating point for a film stretching system for producing a plastics film, wherein possible errors by an operator of the film stretching system are reduced to a minimum.

The object is achieved by the method for setting the operating point in accordance with claim 1. Claim 22 specifies a computer program having program code means for carrying out the method according to the invention. Claim 23 describes a computer program product for carrying out the method according to the invention. A corresponding film stretching system is described with which the operating point can be set. Advantageous embodiments of the method according to the invention are described in claims 2 to 21.

The solution according to the invention provides a film stretching system which comprises a chill roll. Furthermore, an extruder arrangement and a die, in particular in the form of a slot die, are provided. The die is arranged downstream of the extruder arrangement. A plastics melt is discharged onto the chill roll via the die. A stretching arrangement is used to stretch the film. This can comprise at least one longitudinal stretching system having at least one and preferably a plurality of stretching stages. These allow the plastics film to be stretched in the longitudinal direction. The stretching arrangement is arranged downstream of the chill roll. Optionally, the stretching arrangement also includes a transverse stretching system, which is arranged in particular downstream of the longitudinal stretching system and is designed to stretch the plastics film in the transverse direction. Furthermore, a motor arrangement is provided which serves to drive the chill roll and the stretching arrangement. For this purpose, the motor arrangement can comprise one or more electric motors. An operating terminal is also provided. The operating terminal is in particular an input and/or output device. This can be a keyboard and a monitor. A touchscreen can also be used. The operating terminal also comprises a computer unit. An operator can make appropriate entries on the operating terminal and have the results displayed. A memory device is also provided. There is also a control device which is designed to control the motor arrangement, the extruder arrangement and the operating terminal.

The operating point to be set is defined by the interlinked production variables of the film stretching system. These production variables are linked to one another via preferably linear relationships. If one production variable is changed, then at least one more or exactly one more production variable must also be changed. Thus a first production variable, which describes the thickness of the fully stretched plastics film, is linked to a second production variable, which describes the plastics material output quantity of the extruder arrangement, and to a third production variable, which describes the line speed.

As described, the first production variable is the thickness of the fully stretched plastics film. The thickness is, in particular, the thickness that the plastics film comprises when it is wound up. The thickness can be defined in a range between a minimum permissible thickness (below this the film would often tear) and a maximum permissible thickness (above this the film could no longer be stretched as desired). The first production variable is therefore adjustable between these two limit values. The second production variable is the plastics material output quantity of the extruder arrangement. In principle, this can be the net output quantity or the gross output quantity. The gross output quantity comprises the entire output quantity, whereas the net output quantity is often lower. The net output quantity therefore already takes into account an edge region of the plastics film, which is often cut off. For example, when using an optional transverse stretching system, clips can grab the edge region in order to pull the plastics film through the film stretching system. This edge region of the plastics film is cut away. The cut-off edge region is either disposed of or, depending on the type of film, fed back to the extruder arrangement. In this case, the edge region is comminuted beforehand and less unused material would have to be fed from a storage container to the extruder arrangement. The second production variable can also be set in a range between a minimum permissible plastics material output quantity and a maximum permissible output quantity. The third production variable is the line speed of the film stretching system. The line speed is preferably the speed (for example m/min) at which the fully stretched plastics film is wound up at the end. The third production variable is adjustable in the range between a minimum permissible line speed and a maximum permissible line speed.

The method comprises a plurality of method steps. In a first method step, an input is acquired by the operating terminal. This input has a target value for the first, second, or third production variable. In this case, precisely one target value is preferably entered. A setting value is then specified for the other two respective production variables. This is specified automatically for one or both of the other production variables in such a way that the target value is achieved. After all three production variables are linked to one another via a mathematical relationship, the other two production variables can be determined accordingly when a target value is specified. There are a number of solutions for the other two production variables in order to achieve the target value for the selected production variable. In principle, corresponding setting values could be loaded from a lookup table for various target values. This lookup table can be stored in the memory device. The setting values can be empirical values which, together with the target value entered, lead to the film stretching system being operated in a safe operating range. In particular, when a target value is entered for one production variable, those setting values for the other two production variables that have already been used frequently could be loaded. In this way, these setting values can be anticipated directly. In principle, one of the two setting values could be entered via the operating terminal, so that only the further second setting value is automatically specified (calculated).

In a further method step, the motor arrangement and the extruder arrangement are controlled by the control device in such a way that the operating point consisting of the desired target value for one production variable and the two specified setting values for the other two production variables is reached. There is no need for time-consuming manual conversion, which is prone to errors. The film stretching system is therefore always operated in a permissible operating range.

To avoid further errors, the Analysis method step can be carried out before or after the Specification method step. In this method step, it is checked whether the selected target value is in the permissible range for the first, second or third production variable. This permissible range can be stored in the memory device, for example. For example, it can have a minimum thickness of 10 µm, up to a maximum thickness of 60 µm. The line speed can for example also be adjustable between 100 m/min and 600 m/min. Furthermore, the output rate of the extruder arrangement can for example be adjustable between 1,000 kg/h and up to 7,000 kg/h. However, these ranges for the minimum and maximum permissible production variables differ from system to system. If a target value is outside the respective range, the control device is designed to control the operating terminal in such a way that it outputs an error message or a corresponding indication. The method step Acquisition can then be carried out again and the user is requested to enter a new target value.

The setting values, that is to say the production variables, are preferably linked to one another via linear relationships.

In particular, the film thickness (first production variable) depends on the output quantity per unit time of the extruder arrangement (second production variable) and the line speed (third production variable). The target value for the first production variable can be achieved in that the setting value for the second production variable remains unchanged and the setting value for the third production variable is changed. In principle, the setting value for the second production variable could also be changed and the setting value for the third production variable could be left unchanged. Both setting values could also be changed. The same applies to the target value for the second and third production variables.

Specifying the setting values can occur in different ways. As already explained, the setting values can be taken from a lookup table of the memory device. It was also explained that one of the two setting values can be entered via the operating terminal, so that only the other second setting value is automatically specified (calculated). In principle, both setting values could also be specified automatically (without a lookup table). In this case, the specification of the corresponding setting value would take place, among other things, in such a way that a reserve remains for the maximum possible setting values. This reserve can be fixed and possibly depend on a selected profile with which the film stretching system is operated (e.g. energy-saving mode, normal operating mode, etc.). It can also be changed dynamically depending on (measured) operating parameters (e.g. system temperature, system operating time, type of film to be produced, power consumption, length of time since last maintenance).

In this case, the setting value for the first production variable would preferably be selected in such a way that it is spaced at least 15%, 20%, 25%, 30%, 35%, 40% or more than 45% from the maximum permissible thickness of the fully stretched plastics film in the direction of the minimum permissible thickness of the fully stretched plastics film. A plastics film, the thickness of which comes too close to the maximum limit values, could then not be produced immediately (e.g. useful when the system is started up). The same can also apply to the setting value for the second production variable. This is preferably selected such that it is spaced at least 15%, 20%, 25%, 30%, 35%, 40% or more than 45% from the maximum permissible plastics material output quantity of the extruder arrangement in the direction of the minimum permissible plastics material output quantity of the extruder arrangement. In this case, it is ensured that the extruder of the extruder arrangement does not operate too close to its maximum and possibly overheat. The same can also apply to the setting value for the third production variable. This is preferably selected such that it is spaced at least 15%, 20%, 25%, 30% 35%, 40% or more than 45% from the maximum permissible line speed of the film stretching system in the direction of the minimum permissible line speed.

As a result, better consideration is given to the mechanical limitation of the system and the process limits, and it is achieved that there is always a reserve for the maximum possible setting values, wherein the wear on the film stretching system is kept to a minimum during the production of the plastics film. These values can be increased accordingly in the direction of the maximum setting values during operation.

It would also be possible for the setting values to be taken from a lookup table in the memory device. For each target value of each production variable, setting values of the two other production variables are specified and stored in the memory device.

The setting value should preferably also be selected in such a way that it is spaced from the minimum of the possible setting values. Thus the setting value for the first production variable should preferably be selected such that it is spaced at least 15%, 20%, 25%, 30%, 35%, 40% or more than 45% from the minimum permissible thickness of the fully stretched plastics film in the direction of the maximum permissible thickness of the fully stretched plastics film. The same could also apply for the setting value for the second and third production variables.

A corresponding permissible operating range is preferably displayed on the operating terminal. This is further preferably illustrated in the form of a two-dimensional representation. For this purpose, the second production variable is plotted on a first axis and the third production variable on a second axis. A border is also added, wherein all the permissible operating points lie within or on the border. Straight lines can also be drawn in for all the first production variables, all of which have a common origin (at the intersection of the first and second axes) and extend from there in different directions. All the first production variables that lie on a common straight line have the same value. The values for the second and third production variables are different, however. First production variables on different straight lines have different values.

The calculated operating point can be drawn in within the border. An operator immediately recognises how far this operating point is from the border and can therefore estimate very precisely the reserve capacity of the film stretching system with regard to throughput. He knows immediately whether the speed or the output quantity can be increased while maintaining the film thickness. Depending on the order situation, the production speed can therefore be increased or decreased (to reduce wear, to define raw material consumption or to achieve energy savings).

In principle, the illustrated method steps "Acquisition" and "Specification" can be repeated at any time, wherein a new target value or at least one changed setting value is able to be specified. A changed operating point, in particular in addition to the previous operating point, can then be drawn in. This changed operating point can differ from the previous operating point in addition to its position in terms of colour, size and/or shape.

A setting value can preferably also be blocked from further changes. For example, a setting value for the third production variable can be set to a fixed value (specified line speed). When entering a (new) target value for the first production variable (film thickness), only the output quantity of the extruder arrangement is automatically specified and adjusted. The first production variable (thickness of the plastics film) could also be blocked, so that an operator of the film stretching system cannot change this variable, whereas if a further target variable is specified, e.g. for the further output quantity or the line speed, only the other production variable is changed. Such a block could be cancelled by a corresponding actuation of a button and/or by entering a password.

The question of which setting value is blocked for which production variable 20, 21, 22 after entering the target value for a production variable 20, 21, 22 can depend on an evaluation of the previous settings. Thus, in particular the setting value for the production variable 20, 21, 22 which was also blocked in the past when the same production variable 20, 21, 22 was selected as the target value is blocked.

If a target value were to be specified for the third production variable 22, the setting value for the first production variable 20 could, for example, be blocked. When the film stretching system started up (ramping), the thickness of the fully stretched plastics film 2 was kept constant (setting value for the first production variable 20 is blocked) and only the second production variable 21 would have to be adjusted depending on the measured line speed.

The third production variable preferably comprises a first and a second sub-variable. The first sub-variable is the speed at which the chill roll rotates (e.g. m/min) and the second sub-variable is the longitudinal stretching ratio. A multiplication of these two sub-variables results in the third production variable. In principle, the entire third production variable can be blocked against changes in the "Blocking" method step. It would also be possible that only the first or the second sub-variable is blocked against changes. For example, the longitudinal stretching ratio can be specified as unchangeable for production. In principle, the longitudinal stretching system of the stretching arrangement can also comprise a plurality of stretching stages in the longitudinal direction. In this case, the second sub-variable would be formed from a multiplication of the individual stretching ratios. In principle, the entire second sub-variable can be blocked against changes, or the stretching ratios of individual stretching stages could also be blocked against a change. If the longitudinal stretching system is a casting system, the stretching ratio would be constant and could not be changed.

A so-called "ramping time" is acquired by way of the operating terminal. This value indicates how long it takes for the film stretching system to be switched from one operating point to a new operating point. The changes with regard to the output quantity of the extruder arrangement and the changes with regard to the line speed are preferably linearly converted from the old value to the new value within this period of time (by the control device).

In principle, it would also be possible for the plastics film to be formed from a plurality of layers. These layers can be formed from the same material or from different materials. For this purpose, the extruder arrangement comprises a plurality of extruders, wherein each extruder is designed to discharge a plastics melt onto the chill roll (this also includes the use of a die), from which the individual layers of the plastics film are then formed. All the extruders are connected with their outlet directly or indirectly to the common die, in particular to the slot die. The operating terminal can be used to acquire an input relating to the corresponding setpoint specifications for the thicknesses of the respective layers. The control device is then designed to adjust the plastics material output quantities for each of the plurality of extruders in such a way that the plastics material output quantities of the plurality of extruders are in the same ratio to one another as the setpoint specifications for the thicknesses of the respective layers of the fully stretched plastics film. It can in turn be analysed whether the respective plastics material output quantities can be set for each of the plurality of extruders in order to be able to achieve the target value or the setting value for the first production variable. If this is not the case, an error message can be output and the user can be requested to enter further or different setpoint specifications for the individual layers.

The computer program according to the invention having program code means allows the method according to the invention to be carried out when the program is executed on a computer or a digital signal processor. The computer program product having program code means stored in particular on a machine-readable carrier allows the method according to the invention to be carried out when the program is executed on a computer or a digital signal processor.

Figure 2:
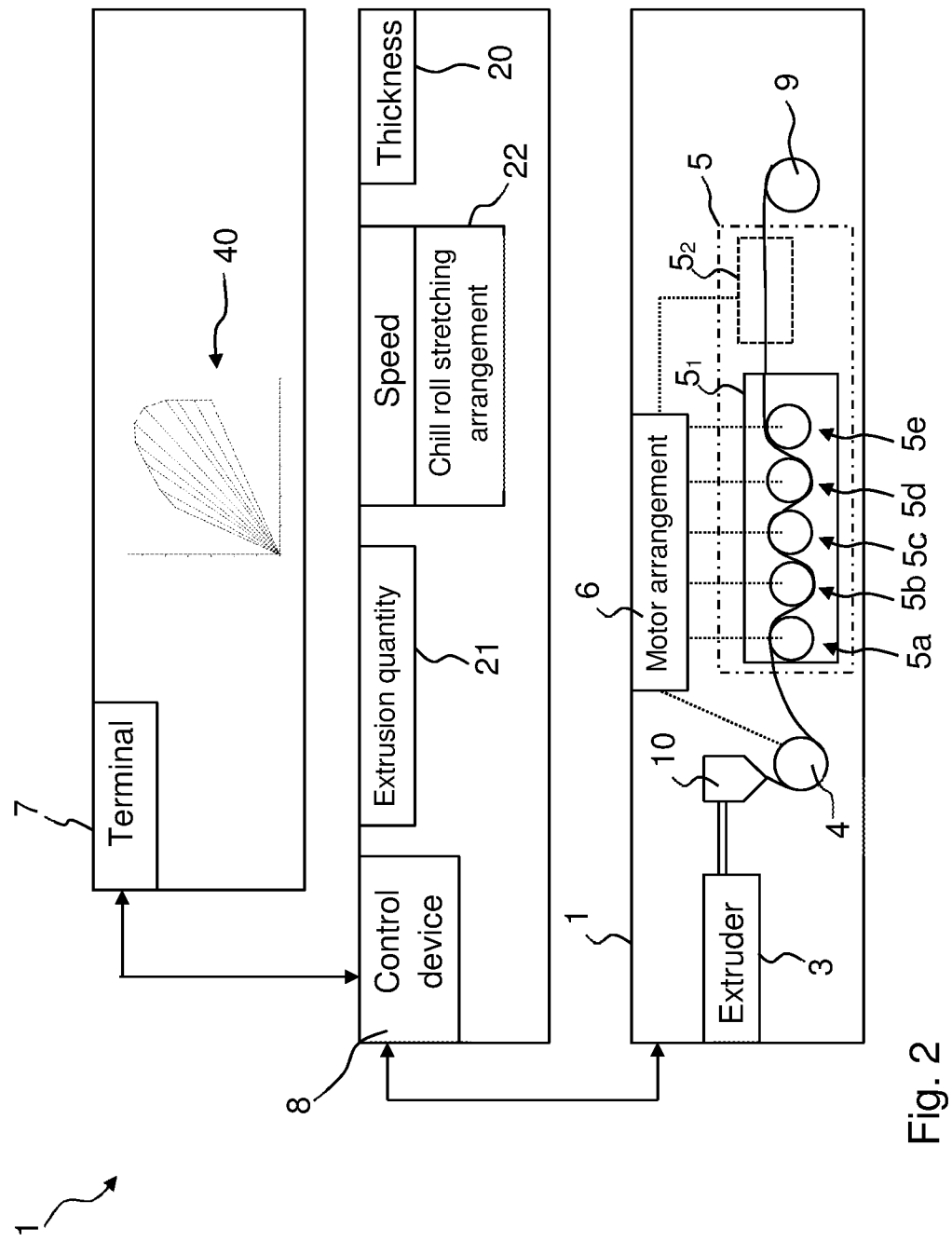
Figure 3:
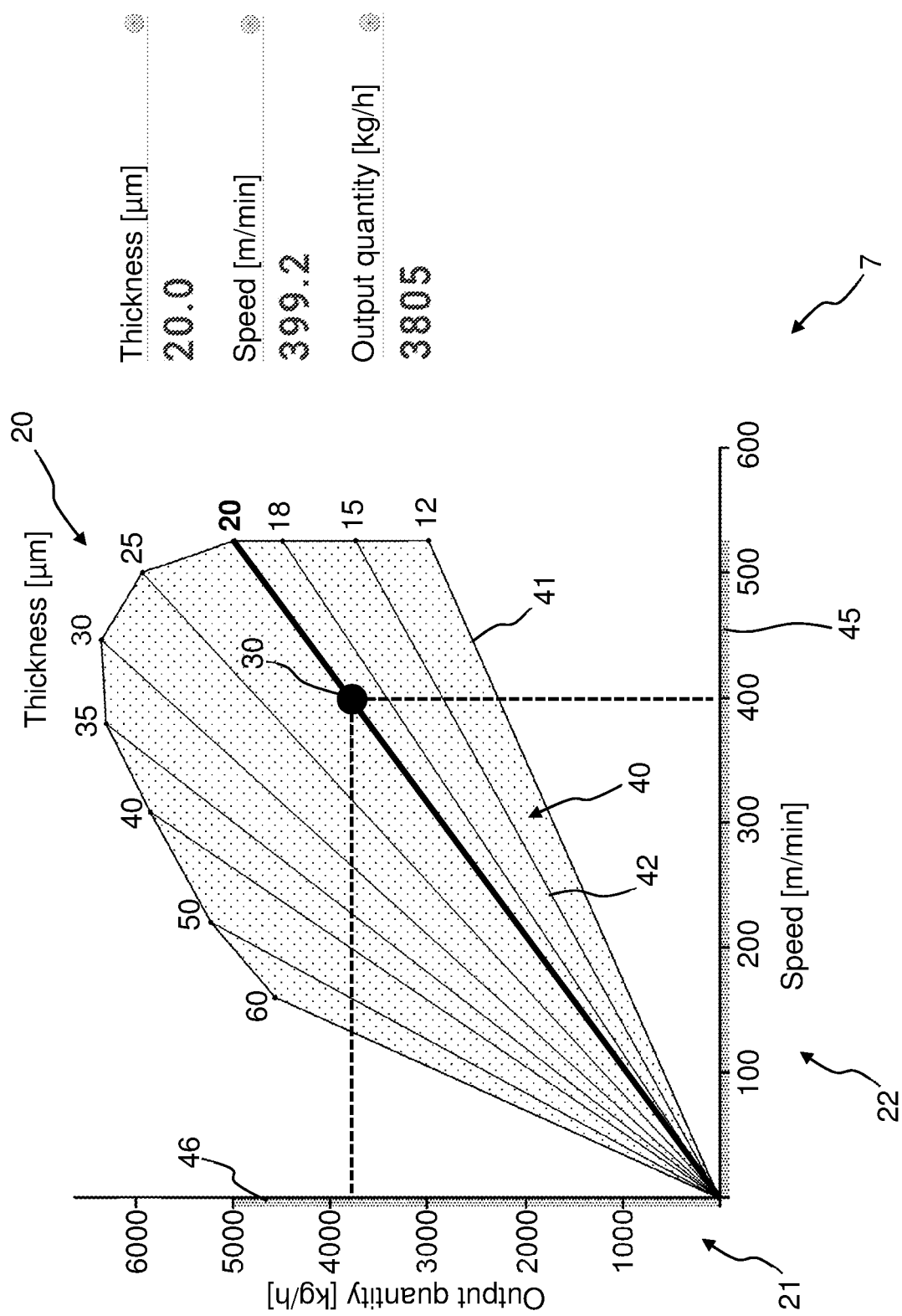
Figure 4A:
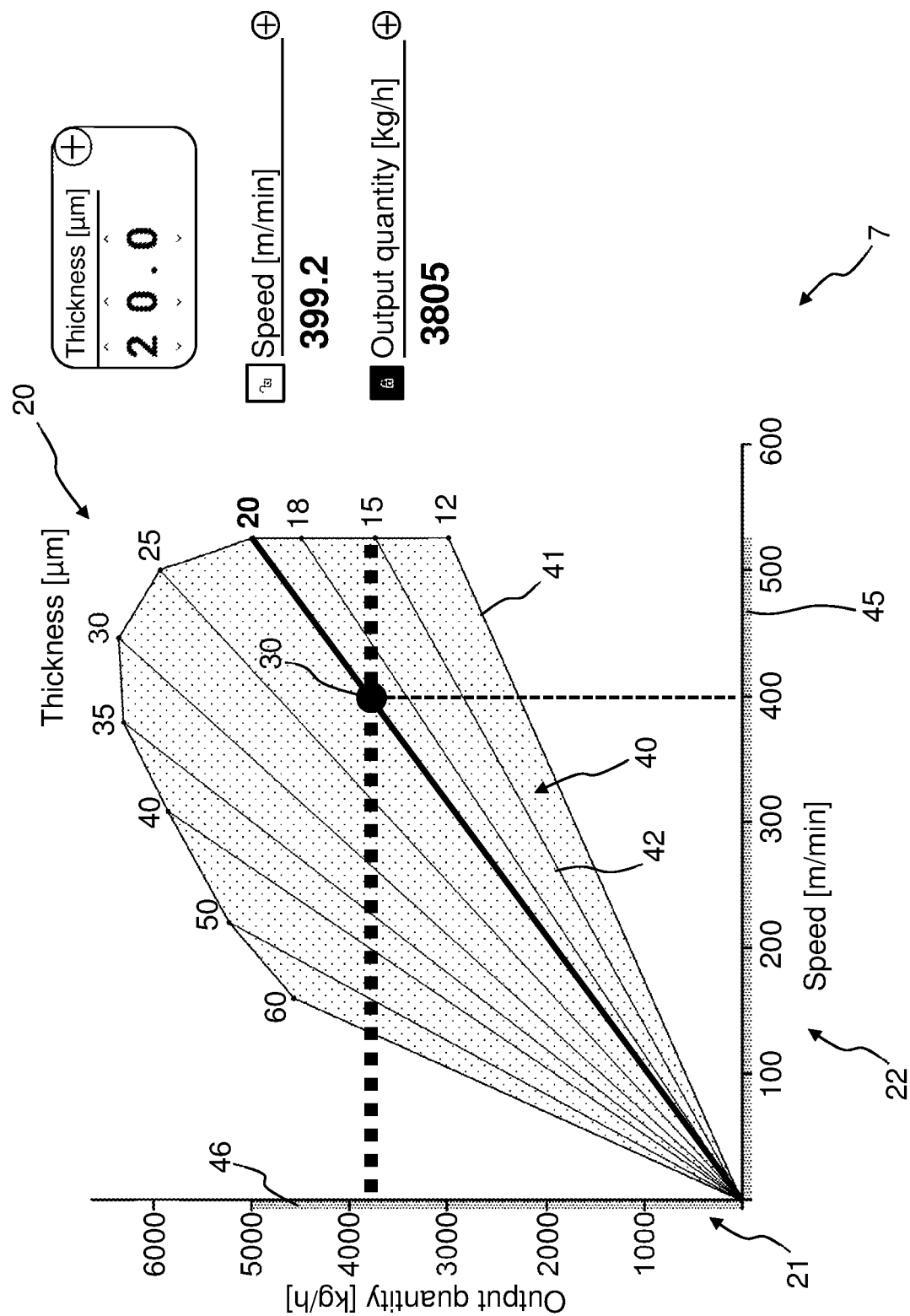
Figure 4B:
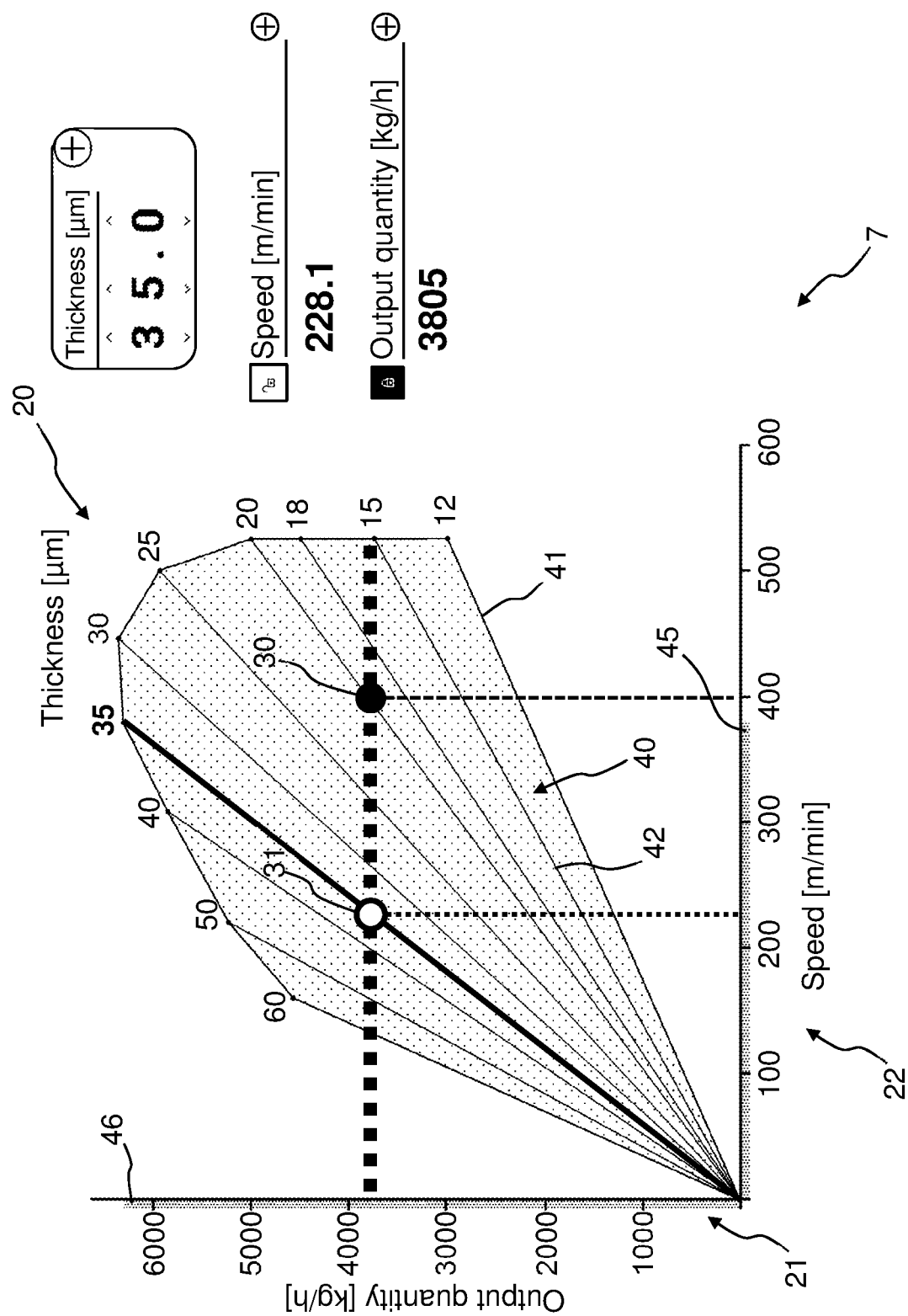
Figure 4C:
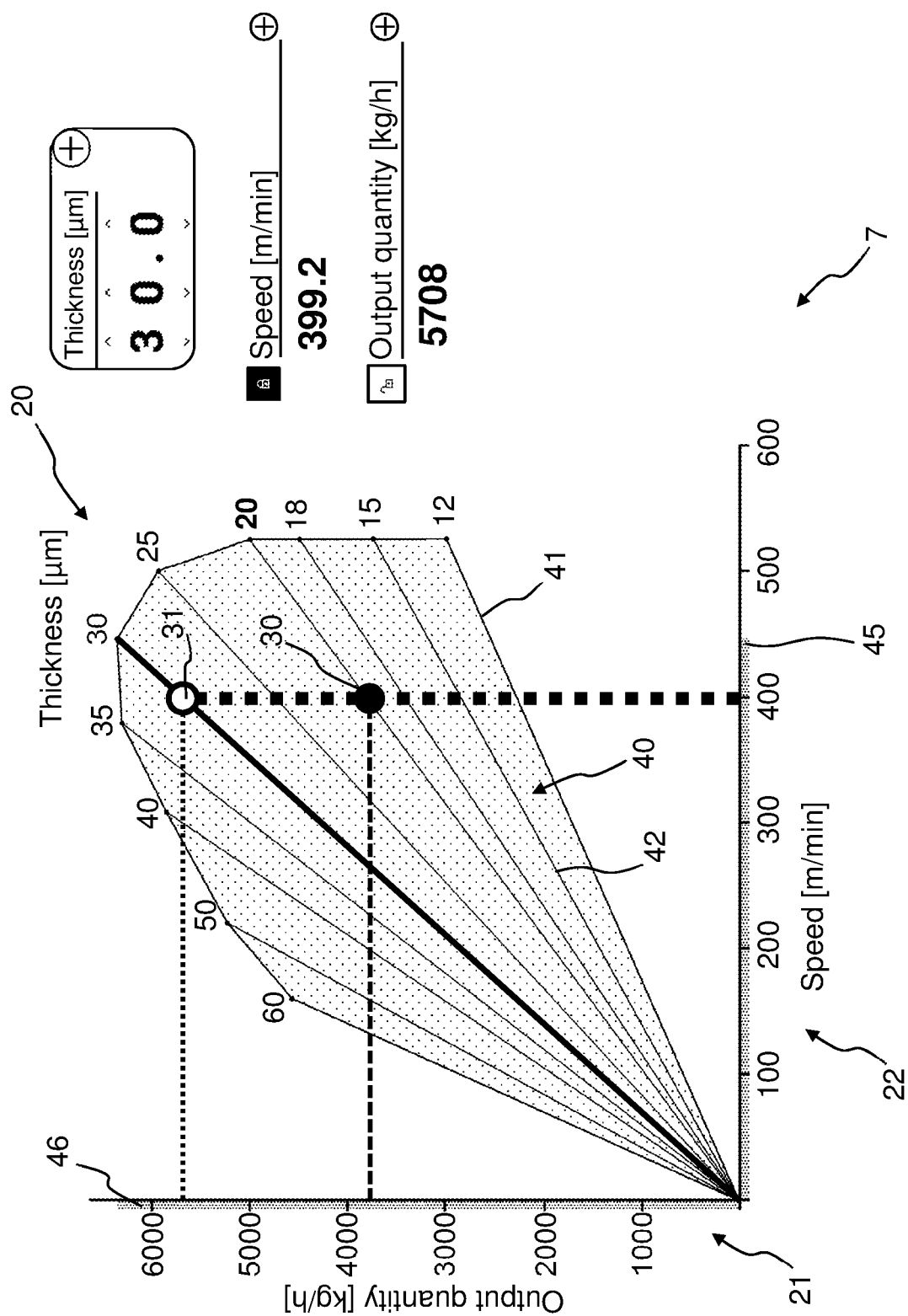
Figure 6A:
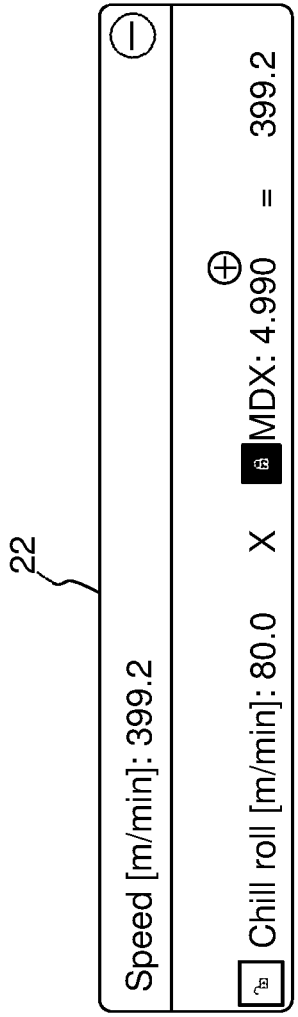
Figure 6B:
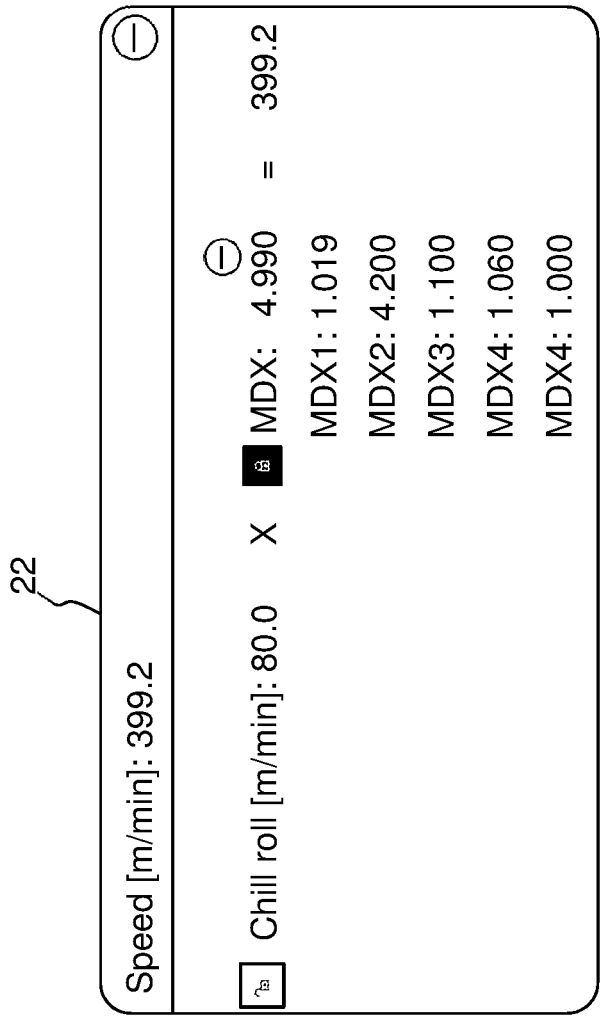

Various embodiments of the invention are described below by way of example with reference to the drawings. The same items have the same reference numerals. In detail, in the corresponding figures of the drawings:

FIG. 1: is an overview of part of a film stretching system for producing a plastics film;

FIG. 2: is a further overview of the film stretching system according to the invention;

FIG. 3: is a visualisation that explains the setting of an operating point for the film stretching system;

FIG. 4A, 4B, 4C: are different visualisations that describe in more detail the setting of an operating point for the film stretching system on the basis of different production variables;

FIG. 5: is a visualisation that describes the relationship between a plurality of layers of the plastics film and the extruder arrangement;

FIG. 6A, 6B: are different visualisations that explain how a production variable is made up; and FIGS. 7A, 7B, 7C, 7D, and 7E: are different flowcharts that describe in more detail the method according to the invention for setting an operating point for the film stretching system.

FIGS. 1 and 2 explain the structure of the film stretching system 1 according to the invention. The film stretching system 1 is used to produce a plastics film 2, which can comprise one or more layers. The film stretching system 1 has for this purpose an extruder arrangement 3, a die 10, in particular in the form of a slot die, a chill roll 4, a stretching arrangement 5 having at least one longitudinal stretching system $5_1$, a motor arrangement 6, which is used to drive the chill roll 4 and the stretching arrangement 5, an operating terminal 7, a memory device 12 and a control device 8, wherein the control device 8 is designed to control the motor arrangement 6, the extruder arrangement 5 and the operating terminal 7. It is clear that a memory device 12 can comprise a plurality of physically separate memories. If in the context of this description only the memory device 12 is mentioned, then this is to be understood in such a way that there can still be any number of memories distributed over the film stretching system 1. The longitudinal stretching system $5_1$ is designed to stretch the plastics film 2 in the longitudinal direction. Optionally, a transverse stretching system $5_2$ (see FIG. 2) can also be provided in order to stretch the plastics film 2 in the transverse direction. The longitudinal stretching system $5_1$ of the stretching arrangement 5 preferably comprises a plurality of stretching stages 5a, 5b, 5c, 5d, 5e. In the embodiment shown, the stretching arrangement 5 comprises five stretching stages 5a, 5b, 5c, 5d and 5e. These stretching stages 5a, 5b, 5c, 5d and 5e comprise rollers (see FIG. 2). All the rollers are preferably driven by different motors of the motor arrangement 6. The speed at which the plastics film 2 is moved through the longitudinal stretching system $5_1$ of the stretching arrangement 5 is increased by the individual stretching stages 5a, 5b, 5c, 5d, 5e towards the output of the longitudinal stretching system $5_1$. This increase in speed can take place linearly and thus evenly distributed over all the stretching stages 5a, 5b, 5c, 5d, 5e. However, this does not have to be the case and so the increase in speed can also take place non-linearly and thus unevenly distributed over all the stretching stages 5a, 5b, 5c, 5d and 5e. It may therefore be that the speed of the plastics film 2 is increased more from the first to the second stretching stage 5a, 5b (in m/min) than from the fourth stretching stage 5d to the fifth stretching stage 5e. This is achieved in particular by increasing the rotational speed of the rollers (from the first stretching stage 5a to the last stretching stage 5e) in that the individual motors of the motor arrangement 6 rotate at different speeds.

The extruder arrangement 3 is used to produce the plastics melt and discharges this plastics melt via the die 10 (for example a slot die) onto the chill roll 4. Deflection rollers 11 can also be arranged after the chill roll 4 and before the stretching arrangement 5 in order to guide the plastics film 2.

The operating terminal 7 preferably comprises both an input and an output device and a computer unit with a processor. The keyboard and monitor are shown here. The operating terminal 7 can additionally or alternatively also comprise a touchscreen. The operating terminal 7 can be connected to the control device 8 via known interfaces, such as a network interface or other interfaces. A memory device 12 can be connected to the operating terminal 7 and/or to the control device 8, which is integrated in the operating terminal 7, for example.

At the output of the film stretching system 1, a winder 9 is also provided, which is used to wind up the fully stretched plastics film 2.

In FIG. 2, the film stretching system 1 is divided into different functional blocks. In a first block, important production variables of the film stretching system 1 are visualised. This visualisation is executed by the operating terminal 7. As already shown, the operating terminal 7 is connected to the control device 8. The control device 8 is designed to control the extruder arrangement 3, the motor arrangement 6 with its motors, and thus the chill roll 4 and the stretching arrangement 5. The control device 8 also comprises sensors which measure the thickness of the plastics film 2 in various stages (for example within the stretching arrangement 5) or at the output of the stretching arrangement 5 or on the winder 9.

Another block comprises the hardware components of the film stretching system 1. This includes the extruder arrangement 3, which can have a plurality of extruders 3a, 3b, 3c, 3d and 3e. The number here is arbitrary. The outlet of this extruder arrangement 3 is connected to the die 10, in particular in the form of a (wide) slot die. The plastics melt that is pressed out of the die 10 is discharged onto the chill roll 4. The plastics film 2 is fed from the chill roll 4 to the stretching arrangement 5. The fully stretched plastics film 2 is wound up on the winder 9. The control device 8 controls these hardware components.

The functionality of the film stretching system 1 is ensured by different production variables 20, 21, 22. A first production variable 20 is a thickness of the fully stretched plastics film 2. This first production variable 20 can be set in a range between a minimum permissible thickness and a maximum permissible thickness. A second production variable 21 is a plastics material output quantity of the extruder arrangement 3. This second production variable 21 can also be set in a range between a minimum permissible plastics material output quantity and a maximum permissible plastics material output quantity. A third production variable 22 is a line speed of the film stretching system 1. In particular, this is understood to mean the speed at which the fully stretched plastics film 2 is wound up on the winder 9. This line speed is in turn adjustable between a minimum permissible line speed and a maximum permissible line speed. All three production variables 20, 21, 22 are interlinked, in particular via linear relationships. This means that when one production variable 20, 21, 22 is changed, at least one further or both further production variables 20, 21, 22 must also be adapted. If the first production variable 20 (thickness of the plastics film 2) is increased, the second production variable 21 (plastics material output quantity of the extruder arrangement 3) must be increased and/or the third production variable 22 (line speed of the film stretching system 1) must be decreased.

All three production variables 20, 21, 22 together define an operating point 30 of the film stretching system 1. Depending on the type of plastics film 2 to be produced, this operating point 30 can be selected differently within a permissible operating range 40.

In the method according to the invention, it is ensured that all the production variables 20, 21, 22, which are used to specify the operating point 30, are located in their respective permissible range. Previous film stretching systems can be operated in impermissible operating ranges 40 due to incorrect entries.

The visualisation of such a permissible operating range 40 is described in FIG. 3. This visualisation takes place (e.g. by the control device 8) preferably on the operating terminal 7. The permissible operating range 40 is illustrated on the operating terminal 7 in the form of a two-dimensional representation. The second production variable 21 is shown on the vertical axis (coordinate axis). The third production variable 22 is shown on the horizontal axis (abscissa). In principle, this display could also be reversed. The permissible operating range 40 is defined together with the first production variable 20. The minimum and maximum values for the respective production variables 20, 21, 22 can be taken from the memory device 12, for example.

A border is also shown, wherein all the permissible operating points 30 lie within this border or on this border 41.

Various straight lines 42 are also shown, which run within the border 41. The straight lines 42 have a common origin from which they extend away. On each straight line 42 lie first production variables 20 which have the same value. First production variables 20, which lie on different straight lines 42, have different values. A straight line 42 is shown in bold in FIG. 3, which has the first production value 20, which indicates that the fully stretched plastics film 2 has a thickness of 20 μm. The operating point 30 is set here in such a way that the second production variable 21 comprises a plastics material output quantity of 3805 kg/h. The third production variable 22 comprises a line speed of 399.2 m/min. If the first production variable 20 is to be retained and the third production variable 22 is to be reduced, then the second production variable 21 must also be reduced so that the operating point 30 continues to be on the straight line 42 shown in bold.

The maximum setting values 45, 46 for the second production variable 21 and the third production variable 22 are also shown. These maximum setting values 45, 46 are indicated by hatched regions 45 on the axes. In order to achieve the maximum production quantity, wherein the first production variable 20 should not be changed, the second production variable 21 can be increased to 5000 kg/h and the third production variable 22 can be increased to 520 m/min.

An operator of the film stretching system 1 can use the visualised operating point 30 to see very precisely how high the reserves are for the maximum possible production variables 20, 21, 22. In particular, he can estimate very precisely the reserve that the film stretching system 1 offers if the first production variable 20 (film thickness) is to be kept constant.

In order to ensure that the operating point 30 lies within the permissible operating range 40, the method according to the invention for setting this operating point 30 provides that an input from the operating terminal 7 is acquired via the control device 8. This input comprises a target value for the first, second or third production variable 20, 21, 22. Following this, the control device 8 specifies a setting value for the two other production variables 20, 21; 21, 22 or 20, 22. The respective setting values are selected in such a way that the predefined target value for the first, second or third production variable 20, 21, 22 is achieved. The motor arrangement 6 and the extruder arrangement 5 are then controlled by the control device 8 in such a way that the operating point 30, which consists of the target value and the two setting values, is reached.

In principle, it is also analysed whether the target value for the first, second or third production variable 20, 21, 22 lies within the permissible range for the respective production variable 20, 21, 22. If this is the case, the target value is adopted accordingly and the setting values for the two other production variables 20, 21, 22 are specified by the control device 8. If this is not the case, then the control device 8 is designed to control the operating terminal 7 in such a way that it displays an error message or a corresponding indication. Following this, the "Acquisition" method step is repeated and the operator is requested again to enter a permissible target value.

As already explained, the setting values are linked to one another via linear relationships. If a target value is specified for the first production variable 20, then this is achieved in that the setting values for the two other production variables 21, 22 are changed. It would also be possible for only one setting value to be changed for one of the other production variables 21, 22 given a predetermined fixed target value for the first production variable 20. The other setting value would be blocked or would not be changed. The same applies if a target value is specified for the second production variable 21 or for the third production variable 22. In this case, the corresponding setting value is changed for exactly one or for both other production variables 20, 21, 22.

If a target value is specified for the first production variable 20, then the first production variable 20 can be regarded as constant or fixed. In this case, the setting values for the other two production variables 21 and 22 can be defined (and changed compared to their previous values). This definition can be done automatically, for example using lookup tables. A setting value for the second or third production variable could also be left unchanged (fixed or blocked) or entered manually via the operating terminal 7. In this case, the setting value for the remaining production variable 21 or 22 is selected such that the predefined target value for the first production variable 20 is achieved with the predefined setting value. The same applies if the predefined target value relates to the second or third production variable 21, 22.

If a setting value is specified for the first production variable 20 (the target value is the second or third production variable 21, 22), then this should be spaced by at least 15%, 20%, 25%, 30%, 35%, 40% or more than 45% from the maximum permissible thickness of the fully stretched plastics film 2 in the direction of the minimum permissible thickness. At the same time, this should preferably also be spaced at least 15%, 20%, 25%, 30%, 35%, 40% or more than 45% from the minimum permissible thickness of the fully stretched plastics film 2 in the direction of the maximum permissible thickness. This ensures that the setting value is far enough away from the limit values to keep the system in safe operation or to allow it to start up.

If the setting value is specified for the second production variable 21 (the target value is the first or third production variable 20, 22), then this should be selected such that it is spaced at least 15%, 20%, 25%, 30%, 35%, 40% or more than 45% from the maximum permissible plastics material output quantity of the extruder arrangement 3 in the direction of the minimum permissible plastics material output quantity. At the same time, it should be selected such that it spaced at least 15%, 20%, 25%, 30%, 35%, 40% or more than 45% from the minimum permissible plastics material output quantity of the extruder arrangement 3 in the direction of the maximum permissible plastics material output quantity.

In the event that the setting value is specified for the third production variable 22 (the first or second production variable 20, 21 is specified as the target value), then this setting value for the third production variable 22 should be selected such that it is spaced at least 15%, 20%, 25%, 30%, 35%, 40% or more than 45% from the maximum permissible line speed of the film stretching systems in the direction of the minimum permissible line speed. At the same time, it should also be selected such that the setting value is spaced by at least 15%, 20%, 25%, 30%, 35%, 40% or more than 45% from the minimum permissible line speed of the film stretching system 1 in the direction of the maximum permissible line speed. What is achieved thereby is that the operating point 30 is not arranged on the border 41, but rather the film stretching system 1 is operated at a distance from the possible limit values. This keeps wear and tear at a lower level.

Referring to FIG. 4A, a target value for the first production variable 20 is specified. The setting values for the second and third production variables 21, 22 are specified in such a way that there is still a reserve for the maximum possible values for the setting values.

According to the invention, it is also possible for a setting value to be blocked against changes. That a setting value is blocked is shown in FIG. 4A by a blocking symbol, in this case by a lock symbol. The blocking symbol can have any design. Font colours alone are also included. In FIG. 4A, the setting value for the second production variable 21 (change in the plastics material output quantity) is blocked. The setting value for changes to the third production variable 22 (line speed) is unblocked. For example, by clicking (e.g. with the mouse or a finger) on the corresponding blocking symbol (e.g. lock) this can be released or a switchover takes place and the other setting value is blocked. A "switchover" is to be understood as a "toggle" so that the released (non-blocked) setting value is blocked and the blocked setting value is released. Any change in the blocking symbol always means that the film stretching system 1 is operated in the permitted operating range 40. The operating point 30 is always in the permitted operating range 40.

After a thickness of 20 μm has been acquired by the operating terminal 7 as the target value for the first production variable in FIG. 4A, the setting value for the released third production variable 22 is set at 399.2 m/min. The motor arrangement 6 and the extruder arrangement 3 are controlled accordingly by the control device 8 so that the operating point 30 is reached.

When changing the first production variable 20 (thickness of the fully stretched plastics film 2), the operating point 30 only moves on the thick, dotted horizontal line. This fact is shown in FIG. 4B. Here the target value for the first production variable 20 was changed from 20 μm to 35 μm.

After the setting value for the second production variable 21 has been blocked against changes, the operating point 30 can only be reached by reducing the third production variable 22 (line speed).

The control device 8 is therefore designed to control the operating terminal 7 in such a way that, when the setting value for the second or third production variable 21, 22 is blocked, it can be visualised by means of a horizontal or vertical line in which range the operating point 30 can be adjusted. If the setting value for the second production variable 21 is blocked, a corresponding horizontal line is shown at the operating point 30. If the setting value for the third production variable 22 is blocked, a corresponding vertical line is shown at the operating point 30. In the event that the first production variable 20 is blocked, the corresponding straight line 42 is highlighted.

After a new target value for the first production variable 20 has been entered in FIG. 4B, a changed operating point 31 is specified. This changed operating point 31 is drawn in with a different colour, size and/or shape compared to the previous operating point 31 within the border 41. For the changed operating point 31, the maximum possible setting parameters 45, 46 for the second and third production variables 21, 22 are again updated and in particular shown in the form of a hatched region on the axes.

In FIG. 4C, the third production variable 22 is blocked against changes. The second production variable 21, however, can be changed. Starting from a target value of 20 μm for the first production variable 20, this target value is increased to 30 μm. It is shown that the operating point 30 shifts along the dashed vertical line. The changed operating point 31 is shown together with the previous operating point 30.

In the simplest case, the extruder arrangement 3 can comprise exactly one extruder 3a. The outlet of the one extruder 3a is connected to the die 10 (in particular a slot die), if necessary, via a melt pump. The extruder arrangement 3 preferably comprises more than one extruder 3a. In particular, the extruder arrangement 3 comprises two, three, four, five, six, seven, eight or more than eight extruders 3a, 3b, 3c, 3d, 3e. These are connected together with the (precisely) one die 10 (in particular a slot die).

In principle, the plastics film 2 can comprise a plurality of layers. This fact is shown in FIG. 5. For this purpose, the extruder arrangement 3 comprises a plurality of (for example two, three, four, five, six, seven, eight or more than eight) extruders 3a, 3b, 3c, 3d, 3e, wherein each extruder 3a, 3b, 3c, 3d, 3e is designed for output of a plastics melt which corresponds to the respective layers of the plastics film 2. The outlets of all the extruders 3a, 3b, 3c, 3d, 3e are preferably jointly connected to the die 10, if necessary by means of (that is, via a) a melt pump. The plastics melt from all the extruders 3a, 3b, 3c, 3d, 3e is discharged onto the chill roll 4 via the die 10. Each of the extruders 3a, 3b, 3c, 3d, 3e preferably discharges a plastics melt which consists of the same material. At least two or all of the extruders 3a, 3b, 3c, 3d, 3e can also discharge different materials. However, these materials should be constituted in such a way that they adhere to one another. Further inputs can be acquired by the control device 8 via the operating terminal 7. These inputs comprise setpoint specifications for the thicknesses of the respective layers of the fully stretched plastics film 2 (right window). It is shown that the layers 1, 2, 4, 5 each have a thickness of 1 μm. The layer 3, which is also the core layer, has a thickness of 16 μm. According to the invention, the plastics material output quantities for each of the plurality of extruders 3a, 3b, 3c, 3d, 3e are adapted in such a way that the plastics material output quantities are in the same ratio to one another as the setpoint specifications for the thicknesses of the respective layers of the fully stretched plastics film 2.

The left output window shows that the extruders 3a, 3b, 3d, 3e each generate 216 kg of plastics melt per hour. The extruder 3c, which can also be referred to as the main extruder, produces a plastics material output quantity of 3,459 kg per hour. Together with the other extruders 3a, 3b, 3d, 3e, this results in an output quantity of 4,219 kg per hour. The fact that the edge regions 2a are cut off (where the plastics film 2 is held by the clips when using a transverse stretching system $5_2$ and guided accordingly) results in a net plastics material output quantity of 3,805 kg per hour of which the film wound on the winder 9 ultimately consists. The cut-off edge region 2a (see FIG. 1) is either disposed of or, depending on the type of film, fed back to the extruder arrangement 3. In this case, this edge region 2a is comminuted. In this case, less unused material would have to be fed to the extruder arrangement 3 from a storage container. The current output quantity of the respective extruder 3a, 3b, 3c, 3d, 3e with regard to the maximum possible plastics material output quantity is also visualised. For this purpose, there is preferably a bar for each extruder 3a, 3b, 3c, 3d, 3e, which bar comprises at least two regions having different colours, for example. A first region represents the permitted operating range (identified, for example, by a white filling) and a second region represents the non-permitted operating range (identified, for example, by a black filling). A corresponding indicator, for example in the form of a marker (e.g. triangular), indicates in which part of a region the respective extruder 3a, 3b, 3c, 3d, 3e of the extruder arrangement 3 is located. The second layer of the plastics film 2 can thus be made thicker to a greater extent than the fifth layer of the plastics film 2 because the extruder 3b has greater reserves than the extruder 3e.

In principle, the control device 8 is designed to analyse whether the respective plastics material output quantity for each of the plurality of extruders 3a, 3b, 3c, 3d, 3e can be adjusted in order to even be able to reach the target value or the setting value for the first production variable 20. The control device 8 is also designed to control the operating terminal 7 in such a way that it outputs an error message or an indication if at least one setpoint specification or a plurality of setpoint specifications relating to the desired thickness for the different layers cannot be achieved. Subsequently, the user is requested to set changed setpoint specifications for the thicknesses of the respective layer of the fully stretched plastics film 2.

In FIGS. 6A and 6B it is explained that the third production variable 22 comprises a first sub-variable and a second sub-variable. The first sub-variable of the third production variable 22 is a speed (in particular in metres per minute) at which the chill roll 4 rotates. The second sub-variable of the third production variable 22 is a longitudinal stretching ratio of the longitudinal stretching system $5_1$ of the stretching arrangement 5, wherein a multiplication of both sub-variables yields the third production variable 22. According to FIG. 6A, the speed of the chill roll 4 is 80 m/min. With a longitudinal stretching ratio of 4.990, the line speed of the film stretching system on the winder 9 is therefore 399.2 m/min.

If changes to the third production variable 22 are blocked (see FIG. 4C), then in the method step Specification both the first and the second sub-variable are not changed. If changes to the third production variable 22 are permitted (see FIG. 4B), then either the first sub-variable or the second sub-variable or both sub-variables can be changed. However, the longitudinal stretching ratio is preferably blocked (see FIG. 6A). The third production variable 22 is therefore only changed by changing the speed of the chill roll 4.

In the event that the longitudinal stretching system $5_1$ of the stretching arrangement 5 of the film stretching system 1 comprises a plurality of stretching stages 5a, 5b, 5c, 5d, 5e in the longitudinal direction, it is possible for these stretching ratios to be changed individually. The second sub-variable would result from a multiplication of all the stretching ratios. In the event that, as shown in FIG. 6A, a change in the stretching ratios is blocked, a change in all of the stretching stages 5a, 5b, 5c, 5d, 5e would be blocked. In the event that the speed of the chill-roll 4 is blocked, but a change in the third production variable 22 is permitted, it can be determined which stretching ratios of the respective stretching stages 5a, 5b, 5c, 5d, 5e are blocked or released. Thus, only changing the stretching ratio of the second stretching stage 5b can be permissible, so that the operating point 30 is reached with a changed target value for the first production variable 20 and a blocked second production variable 21 only by changing the variable for the stretching ratio of the second stretching stage 5b. If the longitudinal stretching system $5_1$ is a cast film system, the stretching ratios cannot be changed.

It is also possible for the operating terminal 7 to acquire an input value for a period of time. This period of time indicates how long it takes before the film stretching system 1 is switched from one operating point 30 to a new operating point 31. The unblocked production variables 20, 21, 22 are changed within this period of time. This change from the old to the new setting value is preferably linear.

In FIGS. 7A, 7B, 7C, 7D and 7E, flowcharts are shown which describe the sequence of the method according to the invention for setting an operating point 30 for a film stretching system 1. In a method step $S_1$, a target value for a first, second or third production variable 20, 21, 22 is acquired by the operating terminal 7. Depending on this target value, the control device 8 specifies setting values for the two other production variables 20, 21, 22 in such a way that the target value is reached. This takes place in method step $S_2$.

In method step $S_3$, the motor arrangement 6 and the extruder arrangement 3 are controlled by the control arrangement 8 in such a way that the operating point 30 consisting of the target value and the two setting values is reached.

In FIG. 7B, in method step S4, it is analysed whether the corresponding target value is within the permissible range for the first, second or third production variable 20, 21, 22. Furthermore, in method step S5, an error message or an indication is output on the operating terminal 7 if the target value is outside the respective range. In this case, method step S6 is carried out, in which method step $S_1$ is repeated.

In FIG. 7C, in method step $S_7$, the permissible operating range 40 is illustrated on the operator terminal 7 in the form of a two-dimensional representation. The corresponding values for this operating range 40 can be loaded from a memory device (not shown). Method step $S_{7A}$ is carried out within method step $S_7$. In this method step, the second production variable 21 is plotted on a first axis and the third production variable 22 on a second axis (both axes are preferably offset by 90° to one another). A border 41 is then drawn in, wherein all the permissible operating points 30 lie within or on this border 41. This takes place in method step $S_{7B}$.

Method step $S_{8a}$ can also be carried out. In this method step, straight lines 42 are drawn into the border 40. These straight lines 42 have a common origin from which they extend away. On each straight line 42 are first production variables 20 which have the same value. At the same time, the operating point 30 can also be drawn in in method step $S_{8b}$. These steps can be in any order.

In FIG. 7D, the maximum setting values 45, 46 for the second production variable 21 and the third production variable 22 are calculated in method step S. This takes place in particular when a target value is specified for the first production variable 20.

Method step $S_{10}$ is then carried out. In this method step, the maximum setting values for the second and third production variables 21, 22 are displayed on the operating terminal 7.

In FIG. 7E, in method step $S_{11}$, it is explained that a setting value can be blocked against changes. This setting value can relate to the first, second or third production variable 20, 21, 22. In method step $S_{12}$, a target value for the released production variable 20, 21, 22 is then acquired.

In method step $S_{13}$, a setting value for the further released production variable 20, 21, 22 is specified. This specification takes place in such a way that the desired target value for one production variable 20, 21, 22 is based on the blocked setting value for another production variable 20, 21; 20, 22; 21, 22 and thus the operating point 30 is reached.

In method step $S_{14}$, the control of the motor arrangement 6 and the extruder arrangement 3 by the control device 8 takes place in such a way that the operating point 30 consisting of the target value, the blocked setting value and the specified released setting value is reached.

Furthermore, the blocked setting value for the first production variable 20, the second production variable 21 or the third production variable 22 is preferably visualised as a blocked setting value (e.g. with a corresponding symbol).

The two setting values can be specified in different ways after a target value has been specified. It is possible for both setting values to be read out from a lookup table in the memory device 12 as a function of the target value. In this lookup table, for each adjustable target value of a production variable 20, 21, 22, preferred setting values are included for the other production variables 20, 21; 20, 22; 21, 22. Alternatively, a further input can be acquired by the operating terminal 7. In this additional input, a user can make a specification for exactly one setting value. The other setting value is then automatically specified (calculated) by the control device 8 in such a way that the target value is achieved while maintaining the one setting value which was acquired by the operating terminal 7.

The invention is not restricted to the embodiments described. In the context of the invention, all of the described and/or depicted features can be combined with one another in any manner.

The invention claimed is:

1. A method for setting an operating point for a film stretching system for producing a plastics film, wherein the film stretching system comprises:
   a chill roll;
   an extruder arrangement and a die, wherein the extruder arrangement is designed to supply a plastics melt to the die and wherein the plastics melt can be discharged from the die onto the chill roll;
   a stretching arrangement which has at least one longitudinal stretching system which comprises at least one stretching stage in the longitudinal direction and is arranged after the chill roll;
   a motor arrangement for driving the chill roll and the stretching arrangement;
   an operating terminal;
   a memory device;
   a control device which is designed to control the motor arrangement, the extruder arrangement and the operating terminal;
   wherein the operating point is defined by linked production variables of the film stretching system, wherein:
   a first production variable is a thickness of the fully stretched plastics film, and wherein the first production variable is adjustable in a range between a minimum permissible thickness of the fully stretched plastics film and a maximum permissible thickness of the fully stretched plastics film; and
   a second production variable is a plastics material output quantity of the extruder arrangement, and wherein the second production variable is adjustable in a range between a minimum permissible plastics material output quantity of the extruder arrangement and a maximum permissible plastics material output quantity of the extruder arrangement; and
   a third production variable is a line speed of the film stretching system, and wherein the third production variable is adjustable in a range between a minimum permissible line speed of the film stretching system and a maximum permissible line speed of the film stretching system;
   wherein the method comprises:
   acquiring an input by the operator terminal, wherein the input contains:
   a) one target value for the first production variable; or
   b) one target value for the second production variable; or
   c) one target value for the third production variable;
   specifying:
   a) a setting value for the second production variable and a setting value for the third production variable in order to achieve the target value for the first production variable); or
   b) a setting value for the first production variable and a setting value for the third production variable in order to achieve the target value for the second production variable); or
   c) a setting value for the first production variable and a setting value for the second production variable in order to achieve the target value for the third production variable, wherein specifying the two setting values for the production variables for which no target value has been acquired is done in such a way that the two setting values are specified automatically to achieve the acquired target value; and
   in such a way that initially a reserve remains for the minimum and/or maximum possible setting values wherein this reserve is changed during operation;
   controlling the motor arrangement and the extruder arrangement by the control device in such a way that the operating point consisting of or comprising the target value and two setting values is reached.

2. The method according to claim 1, further comprising: analysing:
   a) whether the target value for the first production variable lies in a range between the minimum permissible thickness of the fully stretched plastics film and the maximum permissible thickness of the fully stretched plastics film; or
   b) whether the target value for the second production variable lies in a range between the minimum permissible plastics material output quantity of the extruder arrangement and the maximum permissible plastics material output quantity of the extruder arrangement; or c) whether the target value for the third production variable lies in a range between the minimum permissible line speed of the film stretching system and the maximum permissible line speed of the film stretching system;

outputting an error message or an indication on the operating terminal (if the target value is outside the respective range;

repeating the method step Acquisition.

3. The method according to claim 1, further comprising:
the setting values are interlinked via linear relationships, wherein:
a) the target value for the first production variable is achieved in that:
i) the setting value for the second production variable remains unchanged and the setting value for the third production variable is changed; or
ii) the setting value for the second production variable is changed and the setting value for the third production variable remains unchanged; or
iii) the setting values for the second and the third production variable are changed;

or b) the target value for the second production variable is achieved in that:
i) the setting value for the first production variable remains unchanged and the setting value for the third production variable is changed; or
ii) the setting value for the first production variable is changed and the setting value for the third production variable remains unchanged; or
iii) the setting values for the first and the third production variable are changed;

or c) the target value for the third production variable is achieved in that:
i) the setting value for the first production variable remains unchanged and the setting value for the second production variable is changed; or
ii) the setting value for the first production variable is changed and the setting value for the second production variable remains unchanged; or
iii) the setting values for the first and the second production variable are changed.

4. The method according to claim 1, further comprising:
setting the reserve value for the first production variable such that it is spaced at least 15% from the maximum permissible thickness of the fully stretched plastics film in the direction of the minimum permissible thickness of the fully stretched plastics film; and/or
setting the reserve value for the second production variable such that it is spaced at least 15% from the maximum permissible plastics material output quantity of the extruder arrangement in the direction of the minimum permissible plastics material output quantity of the extruder arrangement; and/or
setting the reserve value for the third production variable that it is spaced at least 15% from the maximum permissible line speed of the film stretching system in the direction the minimum permissible line speed of the film stretching system.

5. The method according to claim 1, further comprising:
setting the reserve value for the first production variable such that it is spaced at least 15% from the minimum permissible thickness of the fully stretched plastics film in the direction of the maximum permissible thickness of the fully stretched plastics film; and/or
setting the reserve value for the second production variable such that it spaced at least 15% from the minimum permissible plastics material output quantity of the extruder arrangement in the direction of the maximum permissible plastics material output quantity of the extruder arrangement; and/or
setting the reserve value for the third production variable such that it is spaced at least 15% from the minimum permissible line speed of the film stretching system in the direction the maximum permissible line speed of the film stretching system.

6. The method according to claim 1, further comprising:
illustrating a permissible operating range on the operating terminal in the form of a two-dimensional representation, wherein the illustrating step comprises the following further method steps:
a) plotting the second production variable on a first axis and plotting the third production variable on a second axis;
b) adding a border, wherein the permissible operating points lie within the border and/or on the border.

7. The method according to claim 6, further comprising:
drawing straight lines into the border, wherein the straight lines have a common origin from which they extend away and wherein first production variables lie on each straight line and have the same value, and wherein first production variables which lie on different straight lines have different values.

8. The method according to claim 6, further comprising:
drawing in the operating point within the border.

9. The method according to claim 8, further comprising:
repeating the acquisition and specifying steps, wherein the target value and/or at least one setting value is/are changed;
drawing in the changed operating point in addition to the previous operating point.

10. The according to claim 9, further comprising:
the changed operating point is drawn in with a different colour, size and/or shape compared to the previous operating point within the border.

11. The method according to claim 1, further comprising:
calculating the maximum setting values for the second production variable and the third production variable if the target value relates to the first production variable;
displaying the maximum setting values for the second production variable and the third production variable.

12. The method according to claim 1, further comprising:
blocking a setting value for changes for the first production variable, the second production variable or the third production variable;
acquiring an input by the operating terminal, wherein the input contains a target value for a released production variable;
specifying a setting value for the further released production variable;
controlling the motor arrangement and the extruder arrangement by the control device in such a way that the operating point consisting of the target value, the blocked setting value and the specified setting value, is reached.

13. The method according to claim 1, wherein the specifying step further comprises:
reading out both setting values from a lookup table in the memory device as a function of the target value; or acquiring a further input by the operating terminal for one of the two setting values and automatic specification of the other setting value by the control device in such a way that the target value is reached while maintaining the one acquired setting value.

14. The method according to claim 1, wherein:
the third production variable comprises a first sub-variable and a second sub-variable;
the first sub-variable of the third production variable is a speed at which the chill roll rotates, and the second sub-variable of the third production variable is a longitudinal stretching ratio, wherein a multiplication of both sub-variables results in the third production variable.

15. The method according to claim 14, wherein
if changes to the third production variable are blocked in the method step, the first and second sub-variables are not changed in the Specification method step; or
if changes to the third production variable are released in the Blocking method step, in the Specification method step:
a) the first sub-variable is changed, wherein the second sub-variable is blocked; or
b) the second sub-variable is changed, wherein the first sub-variable is blocked; or
c) the first sub-variable and the second sub-variable are changed.

16. The method according to claim 14, wherein:
the second sub-variable comprises the stretching ratios of the plurality of stretching stages, wherein the stretching ratios multiplied together yield the second sub-variable;
in the blocking method step, a change in the stretching ratio of one or all of the stretching stages can be blocked, so that in the specifying method step for the setting value of the third production variable no stretching ratio or only the stretching ratio of the non-blocked stretching stage can be changed.

17. The method according to claim 1, wherein
in the memory device:
a) the minimum permissible thickness of the fully stretched plastics film and the maximum permissible thickness of the fully stretched plastics film are stored; and
b) the minimum permissible plastics material output quantity of the extruder arrangement and the maximum permissible plastics material output quantity of the extruder arrangement are stored; and
c) the minimum permissible line speed of the film stretching system and the maximum permissible line speed of the film stretching system are stored.

18. The method according to claim 1, wherein:
operating points are stored in the memory device in order to be able to produce specific plastics films.

19. The method according to claim 1, further comprising:
acquiring an input by the operating terminal, wherein the input comprises a value for the period of time which indicates how long it takes for the film stretching system to be switched from one operating point to a new operating point;
in the Control method step, the motor arrangement and the extruder arrangement are controlled by the control device in such a way that the operating point consisting of the target value and two setting values is reached within the time period.

20. The method according to claim 1, wherein:
the plastics film comprises a plurality of layers;
the extruder arrangement comprises a plurality of extruders, wherein each extruder is designed to discharge a plastics melt to the common die, wherein the plastics melts from the individual extruders form the individual layers of the plastics film;
and wherein the method comprises the following method steps:
acquiring a further input by the operating terminal, wherein the input comprises setpoint specifications for the thicknesses of the respective layers of the fully stretched plastics film;
adjusting the plastics material output quantities for each of the multiple extruders so that the plastics material output quantities of the plurality of extruders are in the same ratio as the target values for the thicknesses of the respective layers of the fully stretched plastics film.

21. The method according to claim 20, wherein:
analysing whether the respective plastics material output quantities for each of the plurality of extruders are within a minimum and a maximum plastics material output quantity of the respective extruder in order to be able to achieve the target value or the setting value for the first production variable;
outputting an error message or an indication on the operating terminal if at least one setpoint specification or a plurality of setpoint specifications cannot be achieved;
repeating the method step of acquiring another input.

22. A non-transitory computer-readable media storing program code in order to be able to carry out all the steps according to claim 1 when the program is executed on a computer or a digital signal processor.

23. Film stretching system for producing a plastics film, wherein the film stretching system comprises the following features:
a chill roll;
an extruder arrangement and a die, wherein the extruder arrangement is designed to supply a plastics melt to the die and wherein the plastics melt can be discharged from the die onto the chill roll;
a stretching arrangement which has at least one longitudinal stretching system which comprises at least one stretching stage in the longitudinal direction and is arranged after the chill roll;
a motor arrangement for driving the chill roll and the stretching arrangement;
an operating terminal;
a memory device;
a control device configured to control the motor arrangement, the extruder arrangement and the operating terminal;
wherein the control device is configured to set an operating point of the film stretching system, wherein the operating point is defined by interlinked production variables of the film stretching system, wherein:
a first production variable is a thickness of the fully stretched plastics film, and wherein the first production variable is adjustable in a range between a minimum permissible thickness of the fully stretched plastics film and a maximum permissible thickness of the fully stretched plastics film;
and
a second production variable is a plastics material output quantity of the extruder arrangement, and wherein the second production variable is adjustable in a range between a minimum permissible plastics material output quantity of the extruder arrangement and a maximum permissible plastics material output quantity of the extruder arrangement;
and
a third production variable is a line speed of the film stretching system, and wherein the third production variable is adjustable in a range between a minimum permissible line speed of the film stretching system and a maximum permissible line speed of the film stretching system;
wherein the control device is further configured to acquire an input on the operating terminal, wherein the input contains:
a) a target value for the first production variable; or
b) a target value for the second production variable; or
c) a target value for the third production variable;
and wherein the control device is further configured to specify
a) a setting value for the second production variable and the third production variable in order to achieve the target value for the first production variable; or
b) a setting value for the first production variable and the third production variable in order to achieve the target value for the second production variable; or
c) a setting value for the first production variable and the second production variable in order to achieve the target value for the third production variable;
and wherein the control device is further configured to control the motor arrangement and the extruder arrangement in such a way that the operating point consisting of the target value and two setting values can be achieved.

* * * * *